United States Patent
Tang (10) Patent No.: US 11,477,744 B2
(45) Date of Patent: Oct. 18, 2022

(54) METHOD AND DEVICE FOR TRANSMITTING SYNCHRONIZATION SIGNALS, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 187 days.

(21) Appl. No.: 16/986,542

(22) Filed: Aug. 6, 2020

(65) Prior Publication Data
US 2020/0367186 A1 Nov. 19, 2020

Related U.S. Application Data

(63) Continuation of application No. PCT/CN2018/076005, filed on Feb. 9, 2018.

(51) Int. Cl.
*H04W 56/00* (2009.01)
*H04W 4/40* (2018.01)
*H04W 72/04* (2009.01)
*H04W 92/18* (2009.01)

(52) U.S. Cl.
CPC .......... *H04W 56/001* (2013.01); *H04W 4/40* (2018.02); *H04W 72/0453* (2013.01); *H04W 92/18* (2013.01)

(58) Field of Classification Search
CPC .......... H04L 27/2657; H04W 4/40–48; H04W 56/00; H04W 56/001–0025; H04W 72/04; H04W 72/0453; H04W 92/18
See application file for complete search history.

(56) References Cited

U.S. PATENT DOCUMENTS

| 9,408,168 B2 | 8/2016 | Seo |
| 2011/0312316 A1 | 12/2011 | Baldemair |
| 2014/0050206 A1 | 2/2014 | Seo |

(Continued)

FOREIGN PATENT DOCUMENTS

| CN | 103391622 A | 11/2013 |
| CN | 103491041 A | 1/2014 |

(Continued)

OTHER PUBLICATIONS

Intel Corporation: "Synchronization Aspects for LTE V2V Sidelink Carrier Aggregation", 3GPP Draft; R1-1720032—INTEL-V2X SLCA SYNC, 3rd Generation Partnership Project (3GPP), Mobile Competence Centre; 650, Route Des Lucioles; F-06921 Sophia-Antipolis Cedex; France, vol. Ran WG1, No. Reno, USA; Nov. 27, 2017-Dec. 1, 2017 Nov. 18, 2017 (Nov. 18, 2017), XP051369714.

(Continued)

*Primary Examiner* — Thomas R Cairns
(74) *Attorney, Agent, or Firm* — Perkins Coie LLP (57) ABSTRACT

A method for sending a synchronization signal, a terminal device and a computer storage medium are provided. The method may include: determining a second carrier set based on a first carrier set, wherein the first carrier set includes carriers on which a synchronization reference signal can be provided; and sending a synchronization signal on all carriers in the second carrier set.

9 Claims, 9 Drawing Sheets

(56) References Cited

U.S. PATENT DOCUMENTS

| | | | |
|---|---|---|---|
| 2017/0099581 A1 | 4/2017 | Yang et al. | |
| 2018/0234928 A1 | 8/2018 | Yasukawa et al. | |

FOREIGN PATENT DOCUMENTS

| | | | |
|---|---|---|---|
| CN | 103828398 A | 5/2014 | |
| CN | 104272841 A | 1/2015 | |
| CN | 104429142 A | 3/2015 | |
| CN | 104812053 A | 7/2015 | |
| CN | 104812057 A | 7/2015 | |
| CN | 105474556 A | 4/2016 | |
| CN | 105659675 A | 6/2016 | |
| CN | 105684324 A | 6/2016 | |
| CN | 105684529 A | 6/2016 | |
| CN | 105940763 A | 9/2016 | |
| CN | 105981454 A | 9/2016 | |
| CN | 106068670 A | 11/2016 | |
| CN | 106464553 A | 2/2017 | |
| CN | 106716909 A | 5/2017 | |
| CN | 107396386 A | 11/2017 | |
| CN | 107634924 A | 1/2018 | |
| EP | 3242520 A1 | 11/2017 | |
| WO | 2010038967 A2 | 4/2010 | |
| WO | 2015046264 A1 | 4/2015 | |
| WO | 2016056877 A2 | 4/2016 | |
| WO | 2017026518 A1 | 2/2017 | |
| WO | 2017035300 A1 | 3/2017 | |
| WO | 2017065671 A1 | 4/2017 | |

OTHER PUBLICATIONS

Qualcomm Incorporated: "Synchronization for V2X PC5 Carrier Aggregation", 3GPP Draft; R1-1720409, 3rd Generation Partnership Project (3GPP), Mobile Competence Centre; 650, Route Deslucioles; F-06921 Sophia-Antipolis Cedex: France vol. Ran WG1, No. Reno, USA; Nov. 27, 2017-Dec. 1, 2017 Nov. 18, 2017 (Nov. 18, 2017), XP051369972.
Supplementary European Search Report in the European application No. 18905795.3, dated Dec. 7, 2020.
First Office Action of the European application No. 18905795.3, dated Oct. 20, 2021. 7 pages.
Office Action of the Indian application No. 202017036860, dated Nov. 24, 2021. 6 pages with English translation.
Second Office Action of the Chinese application No. 202010298231.0, dated Jul. 28, 2021. 10 pages with English translation.
Yanyan, Qi; "Performance Analysis and Optimization for Wireless Two-Way Relaying Systems", Chinese Doctoral Dissertation Full Text Database (E-Journal) Information Technology Series, Nov. 10, 2015. 165 pages.
NTT Docomo, Inc. "RP-162201 SR FS NR newRAT", 3GPP TSG RAN meeting #74 RP-162201, Vienna, Austria, Dec. 5-8, 2016. 148 pages.
Xie, J. et al. "A comb-DMRS based CFO estimation scheme for LTE-V systems in high-speed scenario", IEEE 2017 3rd IEEE International Conference on Computer and Communications (ICCC)—Chengdu(Dec. 13, 2017-Dec. 16, 2017). 6 pages.
Notice of Allowance of the Chinese application No. 202010298231.0, dated Oct. 11, 2021. 8 pages with English translation.
Written Opinion of the International Search Authority in the international application No. PCT/CN2018/076005, dated Jun. 29, 2018.
Huawei, HiSilicon, Remaining details for synchronization for carrier aggregation on sidelink, Discussion and decision, 3GPP TSG RAN WG1 Meeting #91 R1-1719514, Nov. 27-Dec. 1, 2017.
ITRI, Discussion on Synchronization aspect in V2X carrier aggregation, Discussion and decision, 3GPP TSG RAN WG1 Meeting 91 R1-1719680, Nov. 27-Dec. 1, 2017.
Samsung, Synchronization in V2X CA, Discussion and Decision, 3GPP TSG RAN WG1 #91 R1-1720250, Nov. 27-Dec. 1, 2017.
Qualcomm Incorporated. "Summary of offline discussions on PC5 CA synchronization"; 3GPP TSG RAN WG1 Meeting #91, R1-1721247, Dec. 1, 2017 (Dec. 1, 2017), part 2, Discussion, http://www.3gpp.org/ftp/tsg_ran/wg1_rl1/TSGR1_91/Docs/R1-1721247.zip.
International Search Report in the international application No. PCT/CN2018/076005, dated Jun. 29, 2018.
First Office Action of the Chinese application No. 202010298231.0, dated Apr. 20, 2021.
First Office Action of the Japanese application No. 2020-542781, dated Feb. 4, 2022. 8 pages with English translation.
First Office Action of the Korean application No. 10-2020-7024982, dated Feb. 4, 2022. 8 pages with English translation.

METHOD AND DEVICE FOR TRANSMITTING SYNCHRONIZATION SIGNALS, AND COMPUTER STORAGE MEDIUM

CROSS-REFERENCE TO RELATED APPLICATION

This is a continuation application of International Patent Application No. PCT/CN2018/076005, filed on Feb. 9, 2018, the content of which is incorporated by reference herein in its entirety for all purposes.

TECHNICAL FIELD

Embodiments of the disclosure relate to the technical field of wireless communications, and particularly to a method for sending a synchronization signal, a terminal device and a computer storage medium.

BACKGROUND

A Long-Term Evolution (LTE) Device-to-Device (D2D) based Sidelink (SL) transmission technology is used in a Vehicle-to-Everything system. Different from the approach that communication data is received or sent through a base station in a conventional LTE system, an end-to-end direct communication mode is employed in the Vehicle-to-Everything system, thus having a higher spectral efficiency and a lower transmission delay.

In the 3rd Generation Partnership Project (3GPP) Rel-14, the Vehicle-to-Everything (V2X) technology is standardized, and, two transmission modes, i.e., mode 3 and mode 4, are defined. In mode 3, a transmission resource for a terminal is allocated by a base station. In mode 4, a terminal determines a transmission resource in a sensing and reservation combined mode.

In a Rel-15 Vehicle-to-Everything system, a multi-carrier transmission solution is introduced, and data of a terminal may be transmitted on one or more carriers. If the terminal transmits data on multiple carriers, time synchronization is needed at first, so that the terminal may perform synchronous transmission on the multiple carriers. Based on this, how to send a synchronization signal is a problem to be solved.

SUMMARY

In order to solve the above technical problem, a method for sending a synchronization signal, a terminal device and a computer storage medium are provided in embodiments of the disclosure.

The technical solutions according to the embodiments of the disclosure may be implemented as follows:

According to a first aspect, in an embodiment of the disclosure, a method for sending a synchronization signal is provided. The method is applied to a terminal device and includes: determining a second carrier set based on a first carrier set, wherein the first carrier set includes carriers, on which a synchronization reference signal can be provided; and sending a synchronization signal on all carriers in the second carrier set.

According to a second aspect, a terminal device is provided in an embodiment of the disclosure. The terminal device includes a processor and a network interface.

The processor is configured to determine a second carrier set based on a first carrier set, wherein the first carrier set includes carriers, on which a synchronization reference signal can be provided; and the network interface is configured to send a synchronization signal on all carriers in the second carrier set.

According to a third aspect, a computer storage medium stored with a program for sending a synchronization signal, which, when executed by at least one processor, implements: determining a second carrier set based on a first carrier set, wherein the first carrier set comprises carriers, on which a synchronization reference signal can be provided; and sending a synchronization signal on all carriers in the second carrier set.

BRIEF DESCRIPTION OF THE DRAWINGS

The drawings described herein are intended for further understanding of the disclosure and constitute part of the disclosure. The exemplary embodiments of the disclosure and the description thereof serve to explain the disclosure, and do not constitute any improper limitation on the disclosure. In the drawings.

DETAILED DESCRIPTION

In order to understand the features and technical content of the embodiments of the disclosure in more detail, the implementation of embodiments of the disclosure will be described in detail below with reference to the accompanying drawings. The accompanying drawings are for reference only and are not intended to limit the embodiments of the disclosure.

In order to facilitate understanding of the technical solution of the embodiments of the disclosure, mode 3 and mode 4 in the Vehicle-to-Everything technology are explained below respectively.

Figure 1:
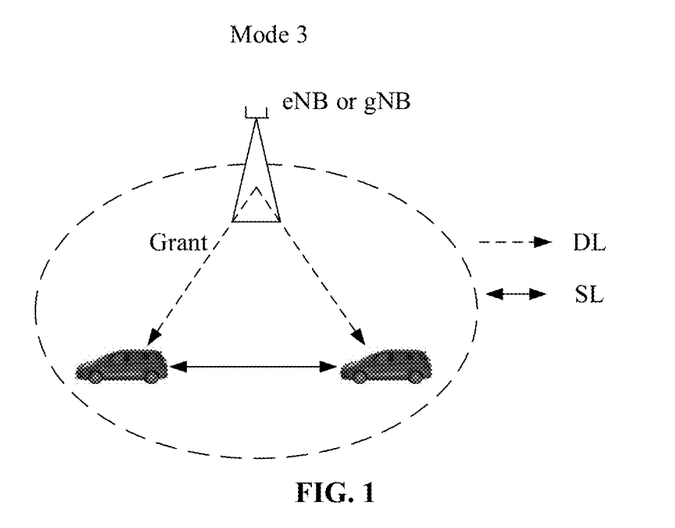
FIG. 1 illustrates a schematic scenario diagram of mode 3 in a Vehicle-to-Everything technology.

Mode 3: as illustrated in FIG. 1, a transmission resource for a vehicle-mounted terminal is allocated by a base station, such as an evolved NodeB (eNB) in LTE, or a gNB in a New Radio (NR) system. Particularly, the base station issues a control message, for indicating to grant a resource, to the vehicle-mounted terminal through a Down Link (DL); and then, the vehicle-mounted terminal sends data over the SL according to the resource allocated by the base station. In mode 3, the base station may allocate, to the vehicle-mounted terminal, a resource for a single time of transmission, and may also allocate, to the terminal, a resource for semi-static transmission.

Figure 2:
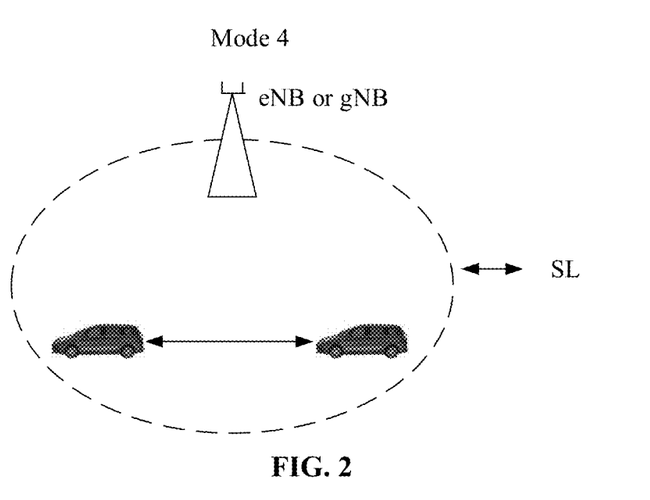
FIG. 2 illustrates a schematic scenario diagram of mode 4 in the Vehicle-to-Everything technology.

Mode 4: as illustrated in FIG. 2, a sensing and reservation combined transmission mode is used in the vehicle-mounted terminal. The vehicle-mounted terminal acquires a set of available transmission resources from a resource pool in a sensing mode, and the vehicle-mounted terminal randomly selects a resource from the set of transmission resources, for data transmission. Since services in the Vehicle-to-Everything system have periodicity, a semi-static transmission mode is usually employed in the vehicle-mounted terminal. That is, after selecting a transmission resource, the vehicle-mounted terminal will continue use the resource in multiple transmission cycles, thereby reducing the probability of resource reselection and resource conflicts. The vehicle-mounted terminal will carry, in control information in this time of transmission, information of a resource to be reserved for next time of transmission, so that other terminals may judge, by detecting the control information of the vehicle-mounted terminal, whether the resource has been reserved to be used by the vehicle-mounted terminal, so as to achieve the purpose of reducing resource conflicts.

It should be noted that in LTE-V2X, mode 3 is used to indicate that a transmission resource for a vehicle-mounted terminal is allocated by a base station, and mode 4 is used to indicate that a transmission resource for a vehicle-mounted terminal is selected by the terminal autonomously. In New Radio Vehicle-to-Everything (NR-V2X), a new transmission mode may be defined, which will not be specified in the disclosure.

For the above Vehicle-to-Everything mode architecture, when a terminal performs synchronous transmission on multiple carriers, a first carrier set is usually configured by a high-level device in a network. The set includes carriers, on which synchronization reference information can be provided. The terminal may select a second carrier set from the first carrier set, and the second carrier set includes a carrier for multi-carrier synchronous transmission by the terminal. Therefore, the second carrier set may be considered as a subset of the first carrier set, and the second carrier set may even be identical to the first carrier set. Since the terminal needs to acquire a synchronization reference by means of the second carrier set to perform synchronous transmission on the multiple carriers, a synchronization signal needs to be sent.

All technical solutions of the embodiments of the disclosure are applicable to not only Vehicle-to-Everything systems, but also other end-to-end communication systems. The terminal in the embodiments of the disclosure may be a vehicle-mounted terminal, a hand-held terminal, a personal digital assistant (PDA), a wearable terminal, and the like. The network in the embodiments of the disclosure may be an NR network, an LTE network, and the like.

A method for sending a synchronization signal, a terminal device and a computer storage medium are provided in embodiments of the disclosure. According to the technical solutions of the embodiments of the disclosure, after a second carrier set is determined from a first carrier set on which a synchronization reference signal can be provided, a synchronization signal for multi-carrier transmission is sent on all carriers in the second carrier set, thereby realizing the purpose of sending the synchronization signal under the condition of multi-carrier transmission in a Vehicle-to-Everything system.

Based on the above two examples of V2X mode architectures, the following embodiments of the disclosure are proposed.

EMBODIMENT 1

Figure 3:
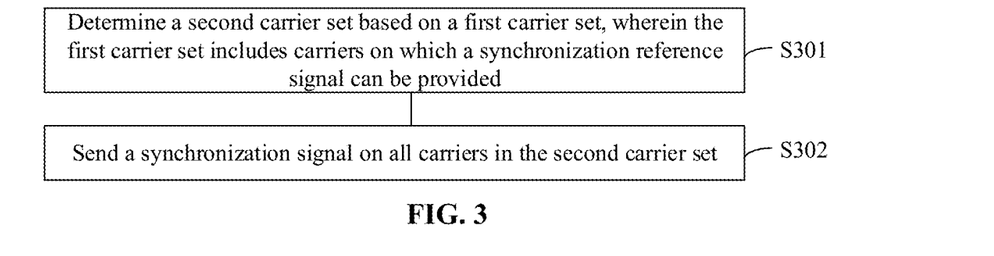
FIG. 3 illustrates a schematic flowchart of a method for sending a synchronization signal provided in an embodiment of the disclosure.

FIG. 3 illustrates the flow of a method for sending a synchronization signal provided in an embodiment of the disclosure. The flow may be applied to a terminal in a V2X architecture. The method may include the following actions:

In action S301, a second carrier set is determined based on a first carrier set. The first carrier set includes carriers, on which a synchronization reference signal can be provided.

In action S302, a synchronization signal is sent on all carriers in the second carrier set.

According to the technical solution as illustrated in FIG. 3, after the second carrier set is determined from the first carrier set on which a synchronization reference signal can be provided, a synchronization signal for multi-carrier transmission is sent on all carriers in the second carrier set, thereby realizing the purpose of sending the synchronization signal under the condition of multi-carrier transmission in a Vehicle-to-Everything system.

According to the technical solution illustrated in FIG. 3, in a possible implementation, the operation of determining the second carrier set based on the first carrier set includes: determining the second carrier set from the first carrier set according to carriers needed by the terminal for data transmission.

According to the above implementation, in this embodiment, the terminal may transmit data using multiple carriers. During particular implementation, the terminal may acquire a transmission resource in mode 3 or may acquire a transmission resource in mode 4. Among the carriers needed by the terminal for data transmission, a second carrier set for a multi-carrier transmission process may be obtained, in combination with the first carrier set on which a synchronization reference signal can be provided.

Based on this, the operation of determining the second carrier set from the first carrier set according to the carriers needed by the terminal for data transmission includes: determining an intersection between the carriers needed by the terminal for data transmission and the first carrier set, to be the second carrier set.

Figure 4:
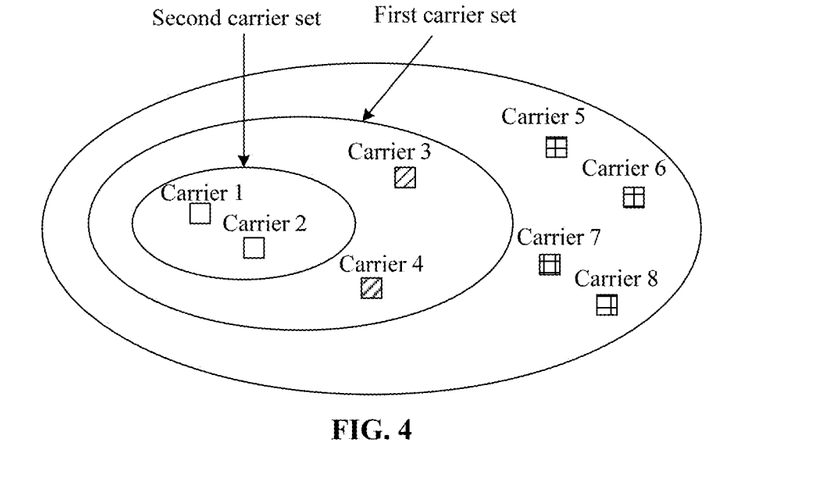
FIG. 4 illustrates a schematic diagram of carrier sets provided in an embodiment of the disclosure.

Taking the carrier sets as illustrated in FIG. 4 as an example, a sidelink system can support 8 carriers in total, which are respectively identified as a carrier 1, a carrier 2, a carrier 3, . . . , a carrier 8. The first carrier set includes the carrier 1 to the carrier 4 and is a carrier set on which synchronization reference information can be provided. Assuming that a terminal UE1 needs to use the carrier 1, the carrier 2, the carrier 5 and the carrier 6 for data transmission, the UE1 may select the second carrier set from the first carrier set in combination with a collection of the carriers needed for data transmission. That is to say, the second carrier set includes the carrier 1 and the carrier 2. It can be seen that the second carrier set is a set of carriers, needed by the terminal UE1 for multi-carrier transmission, included in the first carrier set, and specifically may be obtained by an intersection between the first carrier set and the carriers needed by the UE1 for data transmission. In this way, the second carrier set obtained by the terminal includes the carrier 1 and the carrier 2. It can be understood that because synchronization reference information can be provided on the carrier 1 and the carrier 2, the terminal may firstly acquire synchronization information from the carrier 1 and the carrier 2. For example, the synchronization information acquired by the terminal from the carrier 1 is provided by a base station, and the synchronization information obtained by the terminal from the carrier 2 is provided by another terminal. Then, the terminal may determine, from different information of the different synchronization sources (the base station and the another terminal), the synchronization information needed to be sent, subsequently, the synchronization information needed to be sent may be sent on both the carrier 1 and the carrier 2. Synchronous transmission may be performed on the four carriers, namely the carrier 1, the carrier 2, the carrier 5 and the carrier 6.

In this embodiment, the second carrier set includes at least one carrier, each of which may serve as a synchronization carrier for sending synchronization information. Specifically, in this embodiment, the synchronization information (also referred to as a synchronization source) on the synchronization carrier may be time synchronization information and/or frequency synchronization information based on a GNSS, or time synchronization information and/or frequency synchronization information based on a base station, or time synchronization information and/or frequency synchronization information based on a terminal. The synchronization information on the synchronization carrier is used to provide time synchronization information and/or frequency synchronization information for other carriers, so as to realize multi-carrier synchronous transmission of data.

In action S302, a synchronization signal is sent on all carriers in the second carrier set. The synchronization signal on all carriers in the second carrier set can provide a synchronization reference for another terminal, so that time synchronization and/or frequency synchronization can be realized for each adjacent terminal. Furthermore, the influence caused by half-duplex may be reduced.

According to the technical solution as illustrated in FIG. 3, in view of the second carrier set, in a possible implementation, the operation of sending the synchronization signal on all carriers in the second carrier set in action S302 includes: sending the synchronization signal in a same sub-frame of all carriers in the second carrier set.

Figure 5:
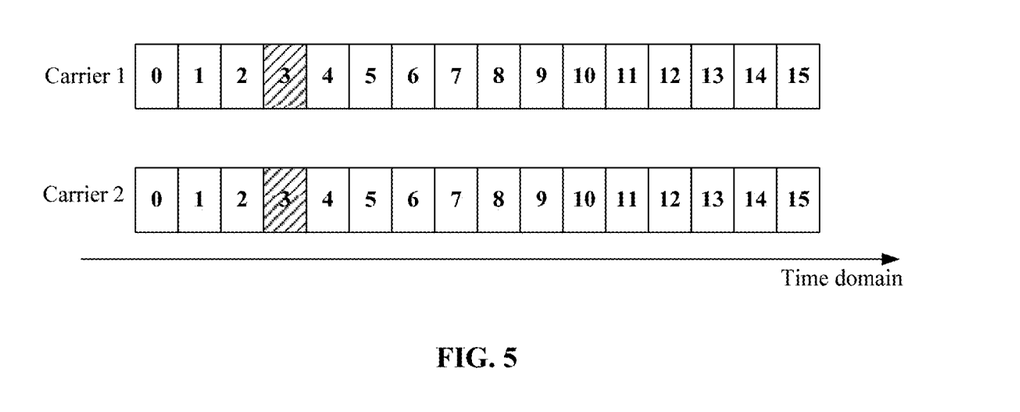
FIG. 5 illustrates a schematic diagram of a carrier sub-frame structure provided in an embodiment of the disclosure.

Specifically, referring to a carrier sub-frame structure as illustrated in FIG. 5, taking the second carrier set illustrated in FIG. 4 as an example, a synchronization signal is sent in a 4th sub-frame, namely the sub-frame 3, in a time domain on both the carrier 1 and the carrier 2, as illustrated by shade lines in FIG. 5. It can be understood that if the synchronization signal is sent in the same sub-frame of all carriers in the second carrier set, then when the terminal informs a peer device for data transmission of the position of a synchronization signal in a synchronization carrier, the position of the synchronization signal can be indicated by only one piece of indication information. The signaling overhead of indication information in the informing process may be saved on.

According to the technical solution as illustrated in FIG. 3, in view of the second carrier set, in a possible implementation, the operation of sending the synchronization signal on all carriers in the second carrier set in action S302 includes: sending the synchronization signal in a different sub-frame of each carrier in the second carrier set.

Figure 6:
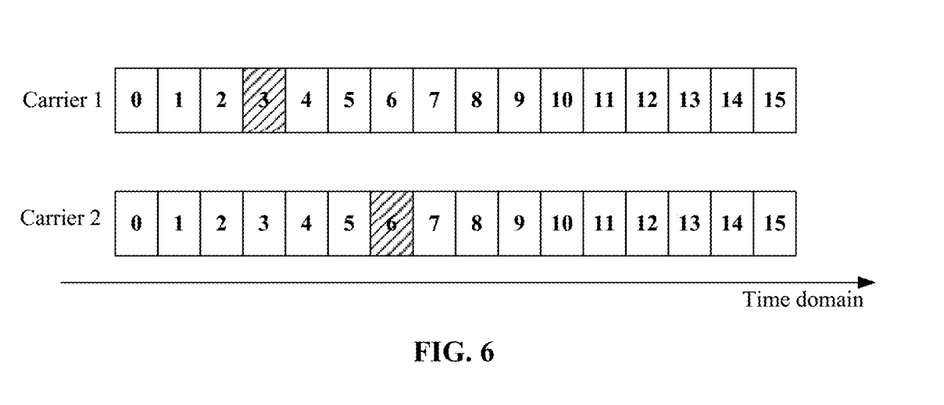
FIG. 6 illustrates a schematic diagram of another carrier sub-frame structure provided in an embodiment of the disclosure.

Specifically, referring to a carrier sub-frame structure as illustrated in FIG. 6, taking the second carrier set illustrated in FIG. 4 as an example, the synchronization signal is transmitted in a different sub-frame in the time domain on the carrier 1 and the carrier 2 respectively, as illustrated by shade lines in FIG. 6. The terminal not only sends the synchronization signal in the 4th sub-frame of the carrier 1, namely the sub-frame 3, but also sends the synchronization signal in the 7th sub-frame of the carrier 2, namely the sub-frame 6. It can be understood that if the synchronization signal is sent in a different sub-frame of each carrier in the second carrier set, then when the terminal informs a peer device for data transmission of the position of a synchronization signal in a synchronization carrier, the transmission failure of the synchronization signal caused due to a conflict between time-domain resources in the same sub-frames in the time domain can be avoided, thereby improving the success rate of synchronization signal transmission.

A method for sending a synchronization signal is provided in this embodiment. After second carrier set is determined from a first carrier set on which a synchronization reference signal can be provided, a synchronization signal for multi-carrier transmission is sent on all carriers in the second carrier set, thereby realizing the purpose of sending the synchronization signal under the condition of multi-carrier transmission in a Vehicle-to-Everything system.

EMBODIMENT 2

Figure 7:
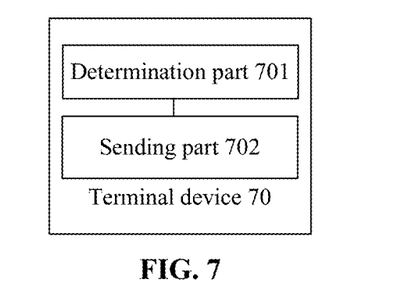
FIG. 7 illustrates a schematic composition diagram of a terminal device provided in an embodiment of the disclosure.

Based on the same inventive concept as the above embodiment, FIG. 7 illustrates composition of a terminal device 70 provided in an embodiment of the disclosure. The terminal device 70 includes a determination part 701 and a sending part 702.

The determination part 701 is configured to determine a second carrier set based on a first carrier set. The first carrier set includes carriers, on which a synchronization reference signal can be provided.

The sending part 702 is configured to send a synchronization signal on all carriers in the second carrier set.

In the above solution, the determination part 701 is configured to: determine the second carrier set from the first carrier set according to carriers needed by the terminal device for data transmission.

In the above solution, the determination part 701 is configured to: determine an intersection between the carriers needed by the terminal for data transmission and the first carrier set, to be the second carrier set.

In the above solution, the sending part 702 is configured to send the synchronization signal in a same sub-frame of all carriers in the second carrier set.

In the above solution, the sending part 702 is configured to send the synchronization signal in a different sub-frame of each carrier in the second carrier set.

In the above solution, the synchronization signal includes: at least one of a Global Navigation Satellite System (GNSS)-based time synchronization signal and/or a GNSS-based frequency synchronization signal; or at least one of a base station based time synchronization signal and/or a base station based frequency synchronization signal; or at least one of a terminal based time synchronization signal and/or a terminal based frequency synchronization signal.

Figure 8:
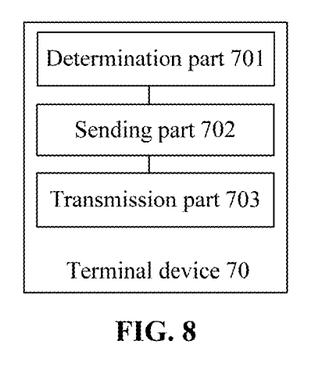
FIG. 8 illustrates a schematic composition diagram of another terminal device provided in an embodiment of the disclosure.

In the above solution, as illustrated FIG. 8, the terminal device 70 further includes a transmission part 703 configured to perform, based on the synchronization signal, multi-carrier synchronous transmission on the carriers needed by the terminal for data transmission.

It can be appreciated that the terminal device 70 in this embodiment may be a terminal device applied to the D2D technology, or even may be a terminal device applied to the V2X technology. Furthermore, in this embodiment, the word "part" may be a circuit part, a processor part, a program or software part, etc., or course may be a unit, and may also be modular or non-modular.

Furthermore, in this embodiment, each component may be integrated in one processing unit, or may separately exist physically, or two or more units may be integrated in one unit. The above integrated unit may be implemented in the form of hardware or in the form of a software function module.

If implemented in the form of a software function module instead of being marketed or used as an independent product, the integrated unit may be stored in a computer-readable storage medium. Based on such understanding, the technical solutions of this embodiment in substance, or in the part contributing to the related art, or all or part of the technical solution may be embodied in the form of a software product. The computer software product is stored in a storage medium and includes instructions for enabling a computer device (which may be a personal computer, a server, a network device or the like) or a processor to perform all or some of actions of the method described in this embodiment. The aforementioned storage medium includes various mediums capable of storing program codes, such as a USB flash disk, a mobile hard disk drive, a read-only memory (ROM), a random access memory (RAM), a magnetic disk and an optical disk.

Therefore, a computer storage medium stored with a program for sending a synchronization signal, which, when executed by at least one processor, implements the actions of the method according to embodiment 1 above is provided in this embodiment.

Figure 9:
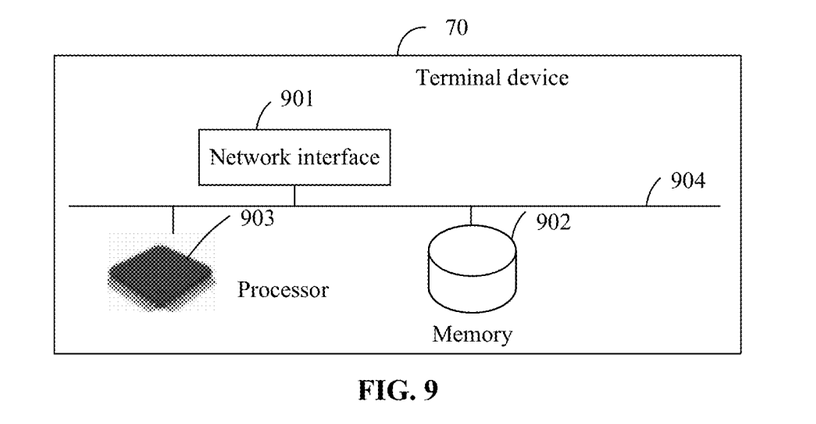
FIG. 9 illustrates a schematic diagram of a particular hardware structure of a terminal device provided in an embodiment of the disclosure.

Based on the terminal device 70 and the computer storage medium above, FIG. 9 illustrates a terminal device 70 provided in an embodiment of the disclosure, including a network interface 901, a memory 902 and a processor 903. The various components are coupled together through a bus system 904. It can be understood that the bus system 904 is used to implement connection and communication among these components. The bus system 904 also includes a power bus, a control bus and a status signal bus besides a data bus. However, for the sake of clarity, all the buses are labeled as the bus system 904 in FIG. 9.

The network interface 901 is configured to receive and send a signal during information transceiving with another external network element.

The memory 902 is configured to store a computer program capable of running on the processor 903.

The processor 903 is configured to perform the following operations upon running the computer program:

A second carrier set is determined based on a first carrier set. The first carrier set includes carriers, on which a synchronization reference signal can be provided. A synchronization signal is on all carriers in the second carrier set.

It can be understood that the memory 902 in the embodiments of the disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM) used as an external cache. By means of exemplary but not restrictive description, many forms of RAMs are available, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM). The memory 902 in the system and the method described in the disclosure is intended to include, but is not limited to, these and any other suitable types of memories.

The processor 903 may be an integrated circuit chip and has a signal processing capability. During implementation, each action of the above method may be completed by an integrated logic circuit in the form of hardware or an instruction in the form of software in the processor 903. The above processor 903 may be a general processor, a digital signal processor (DSP), an application specific integrated circuit (ASIC), a field programmable gate array (FPGA) or other programmable logic devices, discrete gates or transistor logic devices, and discrete hardware components. Various methods, actions and logical block diagrams disclosed in the embodiments of the disclosure may be implemented or performed. The general processor may be a microprocessor or may be any conventional processor. The actions of the method disclosed in combination with the embodiments of the disclosure may be directly embodied to be performed by a hardware decoding processor, or to be performed by a combination of hardware and software modules in a decoding processor. The software module may be located in a storage medium mature in the art, such as a random access memory, a flash memory, a read-only memory, a programmable read-only memory, an electrically erasable programmable memory and a register. The storage medium is located in the memory 902, and the processor 903 reads the information in the memory 902 and completes the actions of the above method in combination with its hardware.

It can be understood that the embodiments described in the disclosure may be implemented by hardware, software, firmware, middleware, microcodes, or a combination thereof. For hardware implementation, a processing unit may be implemented in one or more application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, other electronic units for performing the functions of the disclosure, or a combination thereof.

For software implementation, the technologies described in the disclosure may be implemented by modules, such as processes and functions, for performing the functions described in the disclosure. Software codes may be stored in the memory and performed by the processor. The memory may be implemented inside or outside the processor.

Specifically, the processor 903 in the terminal device 70 is also configured to perform, when running a computer program, the actions of the method in the above embodiment 1, which will not be described herein again.

Described above are merely preferred embodiments of the disclosure, and are not intended to limit the protection scope of the disclosure.

INDUSTRIAL APPLICABILITY

According to the embodiments of the disclosure, after a second carrier set is determined from a first carrier set on which a synchronization reference signal can be provided, a synchronization signal for multi-carrier transmission is sent on all carriers in the second carrier set, thereby realizing the purpose of sending the synchronization signal under the condition of multi-carrier transmission in a Vehicle-to-Everything system.

The invention claimed is:
1. A method for sending a synchronization signal, applied to a terminal device in a sidelink system, comprising:

determining a first carriers set, wherein the first carrier set comprises a plurality of carriers on which a synchronization signal for synchronizing multiple carriers can be transmitted;

determining a set of carriers needed by the terminal device for data transmission;

determining all of carriers which are common in the first carrier set and the set of carriers needed by the terminal device for data transmission as a second carrier set; and sending a synchronization signal in a same sub-frame of carriers in the second carrier set.

2. The method according to claim 1, wherein the synchronization signal comprises:

at least one of a Global Navigation Satellite System (GNSS)-based time synchronization signal or a GNSS-based frequency synchronization signal, at least one of a base station based time synchronization signal or a base station based frequency synchronization signal, or at least one of a terminal based time synchronization signal or a terminal based frequency synchronization signal.

3. The method according to claim 1, further comprising:

performing, based on the synchronization signal, multi-carrier synchronous transmission on the carriers needed by the terminal device for data transmission.

4. A terminal device applied in a sidelink system, comprising a processor and a network interface, wherein the processor is configured to: determine a first carriers set, wherein the first carrier set comprises a plurality of carriers on which a synchronization signal for synchronizing multiple carriers can be transmitted; determine a set of carriers needed by the terminal device for data transmission; and determine all of carriers which are common in the first carrier set and the set of carriers needed by the terminal device for data transmission as a second carrier set; and the network interface is configured to send a synchronization signal in a same sub-frame of carriers in the second carrier set.

5. The terminal device according to claim 4, wherein the synchronization signal comprises:

at least one of a GNSS-based time synchronization signal or a GNSS-based frequency synchronization signal, at least one of a base station based time synchronization signal or a base station based frequency synchronization signal, or a terminal based time synchronization signal or a terminal based frequency synchronization signal.

6. The terminal device according to claim 4, wherein the network interface is further configured to perform, based on the synchronization signal, multi-carrier synchronous transmission on the carriers needed by the terminal device for data transmission.

7. A non-transitory computer storage medium, stored with a program for sending a synchronization signal, which, when executed by at least one processor, implements:

determining a first carriers set, wherein the first carrier set comprises a plurality of carriers on which a synchronization signal for synchronizing multiple carriers can be transmitted;

determining a set of carriers needed by the terminal device for data transmission;

determining all of carriers which are common in the first carrier set and the set of carriers needed by the terminal device for data transmission as a second carrier set; and sending a synchronization signal in a same sub-frame of carriers in the second carrier set.

8. The non-transitory computer storage medium according to claim 7, wherein the synchronization signal comprises:

at least one of a Global Navigation Satellite System (GNSS)-based time synchronization signal or a GNSS-based frequency synchronization signal, at least one of a base station based time synchronization signal or a base station based frequency synchronization signal, or at least one of a terminal based time synchronization signal or a terminal based frequency synchronization signal.

9. The non-transitory computer storage medium according to claim 7, wherein the program is further executed by the at least one processor to implement:

performing, based on the synchronization signal, multi-carrier synchronous transmission on the carriers needed by the terminal device for data transmission.

* * * * *